(12) United States Patent
Miwa

(10) Patent No.: US 12,443,734 B2
(45) Date of Patent: Oct. 14, 2025

(54) DATA TRADING DEVICE, DATA TRADING SYSTEM, DATA TRADING METHOD, AND NON-TRANSITORY COMPUTER-READABLE MEDIUM

(71) Applicant: NEC Corporation, Tokyo (JP)

(72) Inventor: Haruna Miwa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 214 days.

(21) Appl. No.: 18/039,882

(22) PCT Filed: Dec. 9, 2020

(86) PCT No.: PCT/JP2020/045799
§ 371 (c)(1),
(2) Date: Jun. 1, 2023

(87) PCT Pub. No.: WO2022/123671
PCT Pub. Date: Jun. 16, 2022

(65) Prior Publication Data
US 2024/0005019 A1    Jan. 4, 2024

(51) Int. Cl.
*G06F 21/62* (2013.01)
*G06F 21/60* (2013.01)
*G06F 21/64* (2013.01)

(52) U.S. Cl.
CPC ........ *G06F 21/6218* (2013.01); *G06F 21/602* (2013.01); *G06F 21/64* (2013.01)

(58) Field of Classification Search
CPC .... G06F 21/6218; G06F 21/602; G06F 21/64; G06F 21/62
See application file for complete search history.

(56) References Cited

U.S. PATENT DOCUMENTS

2009/0164526 A1   6/2009  Hayashi
2018/0121923 A1*  5/2018  Uhr .................. G06Q 20/223
(Continued)

FOREIGN PATENT DOCUMENTS

JP    2008-124668 A    5/2008
JP    2020-013259 A    1/2020
(Continued)

OTHER PUBLICATIONS

International Search Report for PCT Application No. PCT/JP2020/045799, mailed on Mar. 9, 2021.

*Primary Examiner* — Abiy Getachew

(57) ABSTRACT

A primary-side data trading apparatus is capable of accessing a blockchain and includes a processing unit, a processing information generation unit, a history recording unit, an issuance unit, a protection unit, and a primary-side trading unit. The processing unit generates processed data from original data. The processing information generation unit generates a first transaction including processing information. The history recording unit records the first TX in the BC. The issuance unit issues a processing certificate including the processing information. The protection unit applies protection to the processed data. Upon an unsealing operation, the protected processed data requires an operator to perform collation processing between processing information of the processing certificate and processing information recorded in the BC. The primary-side trading unit provides a secondary-side data trading apparatus with the protected processed data and processing certificate.

8 Claims, 15 Drawing Sheets

(56) References Cited

U.S. PATENT DOCUMENTS

| | | | |
|---|---|---|---|
| 2018/0227293 A1* | 8/2018 | Uhr | G06Q 20/40 |
| 2020/0021446 A1* | 1/2020 | Roennow | H04L 9/0819 |
| 2020/0174990 A1 | 6/2020 | Pratkanis | |
| 2020/0226741 A1* | 7/2020 | Correia Villa Real | G06T 7/62 |
| 2021/0320926 A1 | 10/2021 | Shina et al. | |
| 2022/0166609 A1 | 5/2022 | Igarashi | |

FOREIGN PATENT DOCUMENTS

| | | |
|---|---|---|
| JP | 2020-046993 A | 3/2020 |
| WO | 2020/170685 A1 | 8/2020 |

\* cited by examiner

DATA TRADING DEVICE, DATA TRADING SYSTEM, DATA TRADING METHOD, AND NON-TRANSITORY COMPUTER-READABLE MEDIUM

This application is a National Stage Entry of PCT/JP2020/045799 filed on Dec. 9, 2020, the contents of all of which are incorporated herein by reference, in their entirety.

TECHNICAL FIELD

The present disclosure relates to a data trading apparatus, a data trading system, a data trading method, and a non-transitory computer-readable medium.

BACKGROUND ART

In recent years, sharing and utilizing data among a plurality of interested business operators to create value-added services have been attracting attention. On the other hand, data sharing among a plurality of business operators raise concerns about the increased risk of internal data tampering. For this reason, there is a need for a system that can objectively maintain the legitimacy of data that are subject to processing or trading by business operators that share the data.

For example, Patent Literature 1 discloses an information processing apparatus that, when acquiring data from another system, also acquires history information, based on which the information processing apparatus requests the another system to acquire information identifying the data provision party, generates history information based on the history information, and stores the generated history information in association with the data.

CITATION LIST

Patent Literature

Patent Literature 1: Japanese Unexamined Patent Application Publication No. 2020-046993

SUMMARY OF INVENTION

Technical Problem

However, the above-mentioned information processing apparatus described in Patent Literature 1 can only trace the data back to the data provision party after the acquisition of the data and still has a difficulty in reducing the risk of using and distributing data that have been illicitly tampered with in the process of processing and distribution of the data.

In view of the aforementioned problem, the objective of the present disclosure is to provide a data trading apparatus, a data trading system, a data trading method, and a non-transitory computer-readable medium that reduce the risk of using and distributing data that have been illicitly tampered with in the process of processing and distribution of the data.

Solution to Problem

The data trading apparatus according to one aspect of the present disclosure is capable of accessing a blockchain and includes a processing means, a processing information generation means, a history recording means, an issuance means, a protection means, and a trading means. The processing means executes predetermined processing on original data and generates processed data as a result of the processing. The processing information generation means generates, in response to generation of the processed data, a first transaction that includes processing information indicating that the original data have been processed. The history recording means records the first transaction in the blockchain. The issuance means issues a processing certificate including the processing information. The protection means applies protection to the processed data. The protected processed data require, in response to an unsealing operation, an operator to perform collation processing between processing information included in the processing certificate and processing information recorded in the blockchain. The trading means trades with a secondary-side data trading apparatus and provides the protected processed data and the processing certificate to the secondary-side data trading apparatus.

A data trading apparatus according to one aspect of the present disclosure is capable of accessing the blockchain and includes a trading means and a collation processing means. The trading means trades with a primary-side data trading apparatus. The trading means receives, from the primary-side data trading apparatus, processed data generated as a result of predetermined processing and protection being performed on original data and a processing certificate including processing information indicating that the original data have been processed. The collation processing means collates, when unsealing the protected processed data, processing information included in the processing certificate with processing information included in the first transaction recorded in the blockchain.

A data trading system according to one aspect of the present disclosure includes a primary-side data trading apparatus that is capable of accessing a blockchain and a secondary-side data trading apparatus that is capable of accessing the blockchain.

The primary-side data trading apparatus includes a processing means, a processing information generation means, a history recording means, an issuance means, a protection means, and a primary-side trading means. The processing means executes predetermined processing on original data and generates processed data as a result of the processing. The processing information generation means generates, in response to generation of the processed data, a first transaction that includes processing information indicating that the original data have been processed. The history recording means records the first transaction in the blockchain. The issuance means issues a processing certificate including the processing information. The protection means applies protection to the processed data. The protected processed data require, in response to an unsealing operation, an operator to perform collation processing between processing information included in the processing certificate and processing information recorded in the blockchain. The primary-side trading means trades with a secondary-side data trading apparatus and provides the protected processed data and the processing certificate to the secondary-side data trading apparatus.

The secondary-side data trading apparatus includes a secondary-side trading means and a collation processing means. The secondary-side trading means trades with the primary-side data trading apparatus. The secondary-side trading means receives the protected processed data and the processing certificate from the primary-side data trading apparatus. The collation processing means collates, when unsealing the protected processed data, processing information included in the processing certificate with processing information included in the first transaction recorded in the blockchain.

A data trading method according to one aspect of the present disclosure includes a processing step, a processing information generation step, a history recording step, an issuance step, a protection step, and a trading step. The processing step is a step of executing predetermined processing on original data and generating processed data as a result of the processing. The processing information generation step is a step of generating, in response to generation of the processed data, a first transaction that includes processing information indicating that the original data have been processed. The history recording step is a step of recording the first transaction in the blockchain. The issuance step is a step of issuing a processing certificate including the processing information. The protection step is a step of applying protection to the processed data. The protected processed data require, in response to an unsealing operation, an operator to perform collation processing between processing information included in the processing certificate and processing information recorded in the blockchain. The trading step is a step of trading with a secondary-side data trading apparatus and providing the protected processed data and the processing certificate to the secondary-side data trading apparatus.

A data trading method according to one aspect of the present disclosure includes a trading step and a collation step. The trading step is a step of trading with the primary-side data trading apparatus. The trading step receives, from the primary-side data trading apparatus, processed data generated as a result of predetermined processing and protection being performed on original data and a processing certificate including processing information indicating that the original data have been processed. The collation step collates, when unsealing the protected processed data, processing information included in the processing certificate with processing information included in the first transaction recorded in the blockchain.

The non-transitory computer-readable medium according to one aspect of the disclosure stores a program for causing a computer to execute a processing process, a processing information generation process, a history recording process, an issuance process, protection process and a trading process. The processing process is a process of executing predetermined processing on original data and generating processed data as a result of the processing. The processing information generation process is a process of generating, in response to generation of the processed data, a first transaction that includes processing information indicating that the original data have been processed. The history recording process is a process of recording the first transaction in the blockchain. The issuance process is a process of issuing a processing certificate including the processing information. The protection process is a process of applying protection to the processed data. The protected processed data require, in response to an unsealing operation, an operator to perform collation processing between processing information included in the processing certificate and processing information recorded in the blockchain. The trading process is a process of transacting with a secondary-side data trading apparatus and providing the protected processed data and the processing certificate to the secondary-side data trading apparatus.

The non-transitory computer-readable medium according to one aspect of the present disclosure stores a program for causing a computer to execute a trading process and a collation process. The trading process trades with the primary-side data trading apparatus. The trading process is a process of receiving, from the primary-side data trading apparatus, processed data generated as a result of predetermined processing and protection being performed on original data and a processing certificate including processing information indicating that the original data have been processed. The collation process is a process of collating, when unsealing the protected processed data, processing information included in the processing certificate with processing information included in the first transaction recorded in the blockchain.

Advantageous Effects of Invention

The present disclosure can provide a data trading apparatus, a data trading system, a data trading method, and a non-transitory computer-readable medium that reduces the risk of using and distributing data that have been illicitly tampered with in the process of processing and distribution of the data.

EXAMPLE EMBODIMENT

The following describes the present disclosure by means of example embodiments without limiting the invention according to the claims to the following example embodiments. Furthermore, not all of the components described in the example embodiments are necessary as means for solving the problem. For clarity of description, the following description and drawings are omitted and simplified as appropriate. Note that, in each of the drawings, the same elements are given the same reference signs and numerals.

Problem to be Solved by Embodiment

The following reiterates the problem that the example embodiments seek to solve. In recent years, there is a need for objectively proving the legitimacy of data to be traded in systems where a plurality of business operators share and utilize the data.

Especially in a field such as biometric authentication and video analysis, preprocessing, such as feature extraction, is usually performed on captured images in order to reduce the data size of data to be shared. Since the captured image includes biometric information (personal information), the preprocessed data are further processed for concealment when sharing the data.

In order to prove the legitimacy of data to be traded in such a system, it is important to objectively prove that the processing history that records the processes and processing software used for data processing has not been tampered with, that is, the legitimacy of the data processing history. In turn, it is important to reduce the risk of using, distributing, and spreading data that are illicitly tampered with in the process of processing and distribution of the data.

The data processed in such a manner are often shared on the cloud. However, it is difficult to prove the legitimacy of the data processing history on the cloud side.

In the above-mentioned information processing apparatus described in Patent Literature 1, even if the legitimacy of the processing history can be proved, it is difficult to reduce the risk of illicitly tampered data being used, distributed, and spread.

In addition, when there is any failure in the data in the process of processing and distribution of the data, taking a measure such as identifying the scope of influence and recalling (deletion and/or restoration) is necessary. However, taking such a measure is not easy since the data have been distributed over different organizations.

The present disclosure was made to solve such a problem, and the following describes the example embodiments.

FIRST EXAMPLE EMBODIMENT

Figure 1:
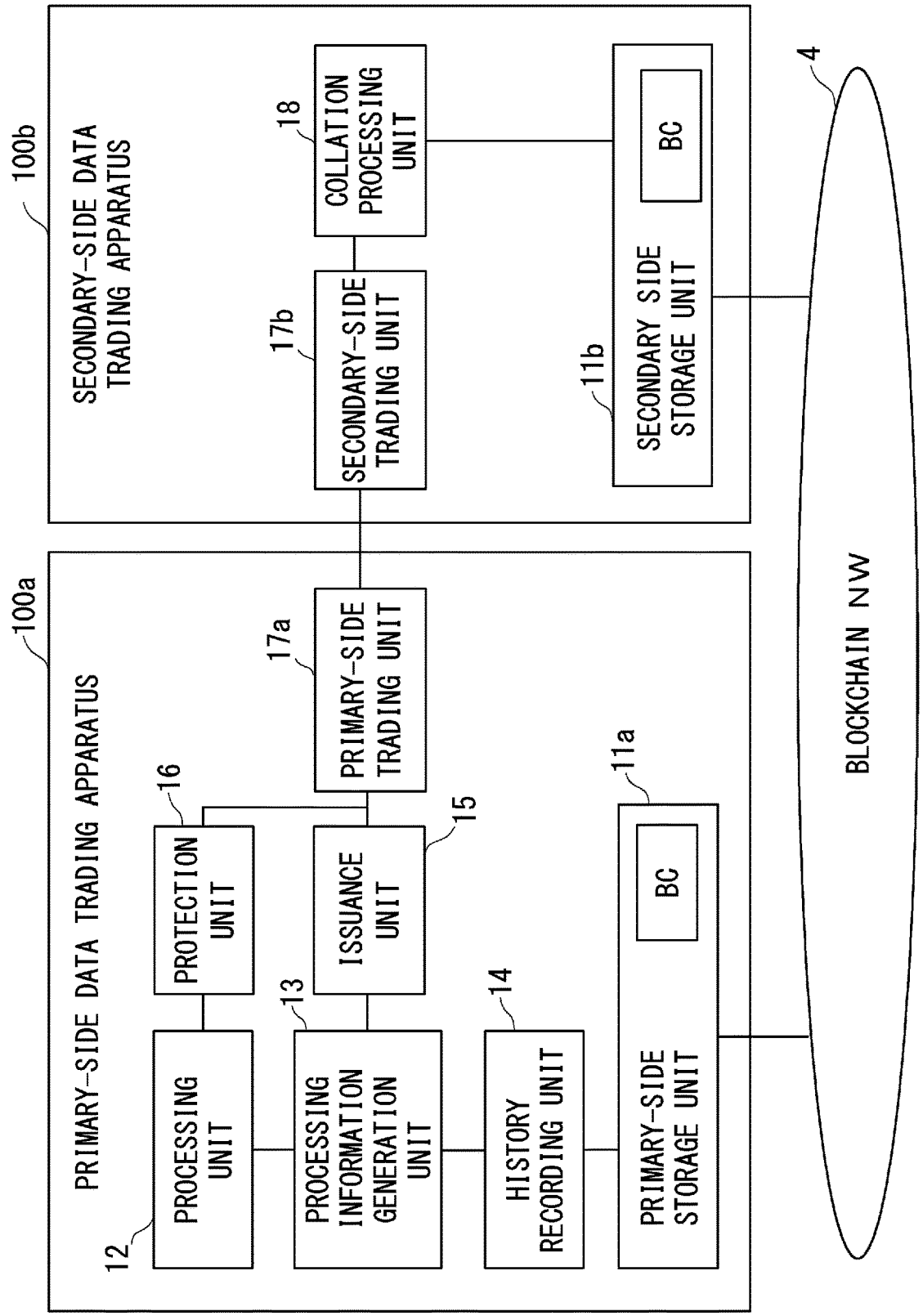
FIG. 1 is a schematic block diagram of a data trading system according to a first example embodiment.

First, a first example embodiment of the present disclosure is described with reference to FIGS. 1 and 2. FIG. 1 is a schematic block diagram of a data trading system 1 according to the first example embodiment.

The data trading system 1 is a computer system where a plurality of data trading apparatuses utilize data that have undergone predetermined processing. The data trading apparatus is a computer for trading processed data. The data trading system 1 manages the legitimacy of the data that are traded using a blockchain BC. The data trading system 1 includes a blockchain network (NW) 4 and, as examples of the data trading apparatus, a primary-side data trading apparatus 100*a* and a secondary-side data trading apparatus 100*b*.

The blockchain NW 4 is a P2P network for communications between nodes sharing the blockchain BC; in this example, the primary-side data trading apparatus 100*a* and the secondary-side data trading apparatus 100*b*.

The primary-side data trading apparatus 100*a* is a computer that performs predetermined processing on original data and provides the processed data to the secondary-side data trading apparatus 100*b*. The primary-side data trading apparatus 100*a* is capable of accessing the blockchain BC. The primary-side data trading apparatus 100*a* includes a primary-side storage unit 11*a*, a processing unit 12, a processing information generation unit 13, a history recording unit 14, an issuance unit 15, a protection unit 16, and a primary-side trading unit 17*a*.

The primary-side storage unit 11*a* is a storage area that stores the blockchain BC that is shared among nodes through the blockchain NW 4.

The processing unit 12 acquires original data, executes predetermined processing on the original data, and generates processed data as a result of the processing.

The processing information generation unit 13 generates processing information indicating that the original data have been processed in response to generation of the processed data. The processing information generation unit 13 then generates a first transaction (TX) including the processing information. Here, the TX is the historical information of processing related to the processed data, and the first TX is the historical information of the processing process of the processed data.

The history recording unit 14 records the generated first TX in the blockchain BC. In other words, the history recording unit 14 broadcasts the first TX to the blockchain NW 4. The broadcasted first TX undergoes processing by the blockchain NW 4 and is added to the blockchain BC as a block including one or more TXs. As a result, the processing history of the processed data is recorded in the blockchain BC.

The issuance unit 15 issues a processing certificate. The processing certificate is a certificate certifying the processing history of the processed data and includes processing information generated by the processing information generation unit 13. The issued processing certificate is provided to the secondary-side data trading apparatus 100*b* at the time of trading.

The protection unit 16 applies protection to the processed data and generates protected processed data. Herein, the protected processed data are configured to require, in response to an unsealing operation, the operator to perform collation processing between the processing information included in the processing certificate and the processing information recorded in the blockchain BC. Note that the unsealing operation is an operation carried out when starting use of the data and is specifically an operation for requesting the output of the content of the data. Herein, use of the data refers to unsealing of the data, collation of the processing information, display or audio output of the data, processing of the data, provision (trading) of the data, and/or the like.

The primary-side trading unit 17*a* trades with the secondary-side data trading apparatus 100*b* and provides the protected processed data and the processing certificate to the secondary-side data trading apparatus 100*b* via a communication network.

The secondary-side data trading apparatus 100*b* is a computer that acquires processed data from the primary-side data trading apparatus 100*a* and uses the processed data. The secondary-side data trading apparatus 100*b* is capable of accessing the blockchain BC. The secondary-side data trading apparatus 100b includes a secondary-side storage unit 11b, a secondary-side trading unit 17b, and a collation processing unit 18.

The secondary-side storage unit 11b is a storage area that stores the blockchain BC shared among nodes through the blockchain NW 4.

The secondary-side trading unit 17b trades with the primary-side data trading apparatus 100a. The secondary-side trading unit 17b receives the protected processed data and the processing certificate from the primary-side data trading apparatus 100a.

When unsealing the protected processed data, the collation processing unit 18 collates the processing information included in the processing certificate with the processing information included in the first TX recorded in the blockchain BC.

Thus, the data trading system 1 of the first example embodiment requires, upon unsealing of the data, proving that the processing history of the processed data is legitimate. Accordingly, when the legitimacy cannot be proved, a measure, such as restricting use of the processed data by the data recipient or causing the data recipient to send a notification to the data provision party, the administrator, or the like, can be taken. This reduces the risk of using, distributing, and spreading data that have been illicitly tampered with in the process of processing and distribution of the data in a system where a plurality of users utilize the processed data.

Hereafter, the primary-side data trading apparatus 100a and the secondary-side data trading apparatus 100b may be referred to simply as the data trading apparatus 100.

Figure 2:
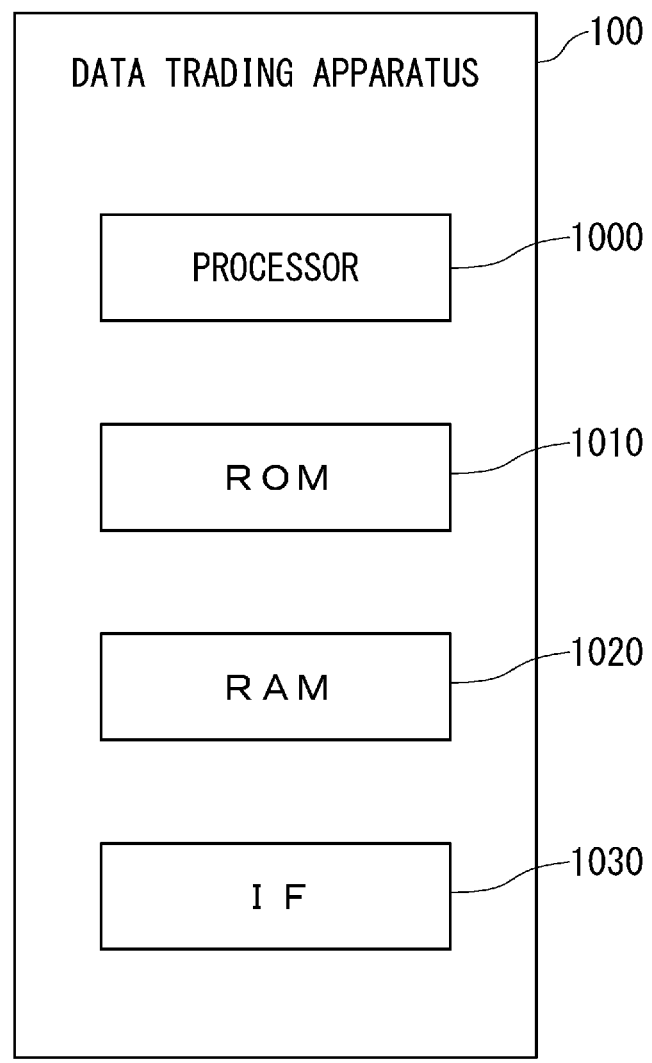
FIG. 2 is a diagram illustrating the hardware configuration of a data trading apparatus according to the first example embodiment.

FIG. 2 is a diagram illustrating the hardware configuration of the data trading apparatus 100 according to the first example embodiment.

The data trading apparatus 100 has a processor 1000, a read only memory (ROM) 1010, a random access memory (RAM) 1020, and an interface (IF) unit 1030 as main hardware components. The processor 1000, the ROM 1010, the RAM 1020, and the interface unit 1030 are connected to one another via a data bus or the like.

The processor 1000 functions as an arithmetic apparatus that performs control processing, arithmetic processing, and the like. The processor 1000 may be a central processing unit (CPU), a graphics processing unit (GPU), a field-programmable gate array (FPGA), a digital signal processor (DSP), an application specific integrated circuit (ASIC) or a combination of any of the above. The ROM 1010 has a function of storing a control program, an arithmetic program, and/or the like to be executed by the processor 1000. The RAM 1020 has a function of temporarily storing processed data and/or the like. The interface unit 1030 inputs/outputs a signal to/from an external apparatus through a wired or wireless communication. The interface unit 1030 also accepts an operation for inputting data by a user and displays information to the user. For example, the interface unit 1030 of the primary-side data trading apparatus 100a communicates with the interface unit 1030 of the secondary-side data trading apparatus 100b.

SECOND EXAMPLE EMBODIMENT

Next, a second example embodiment of the present disclosure is described with reference to FIGS. 3 to 8.

Figure 3:
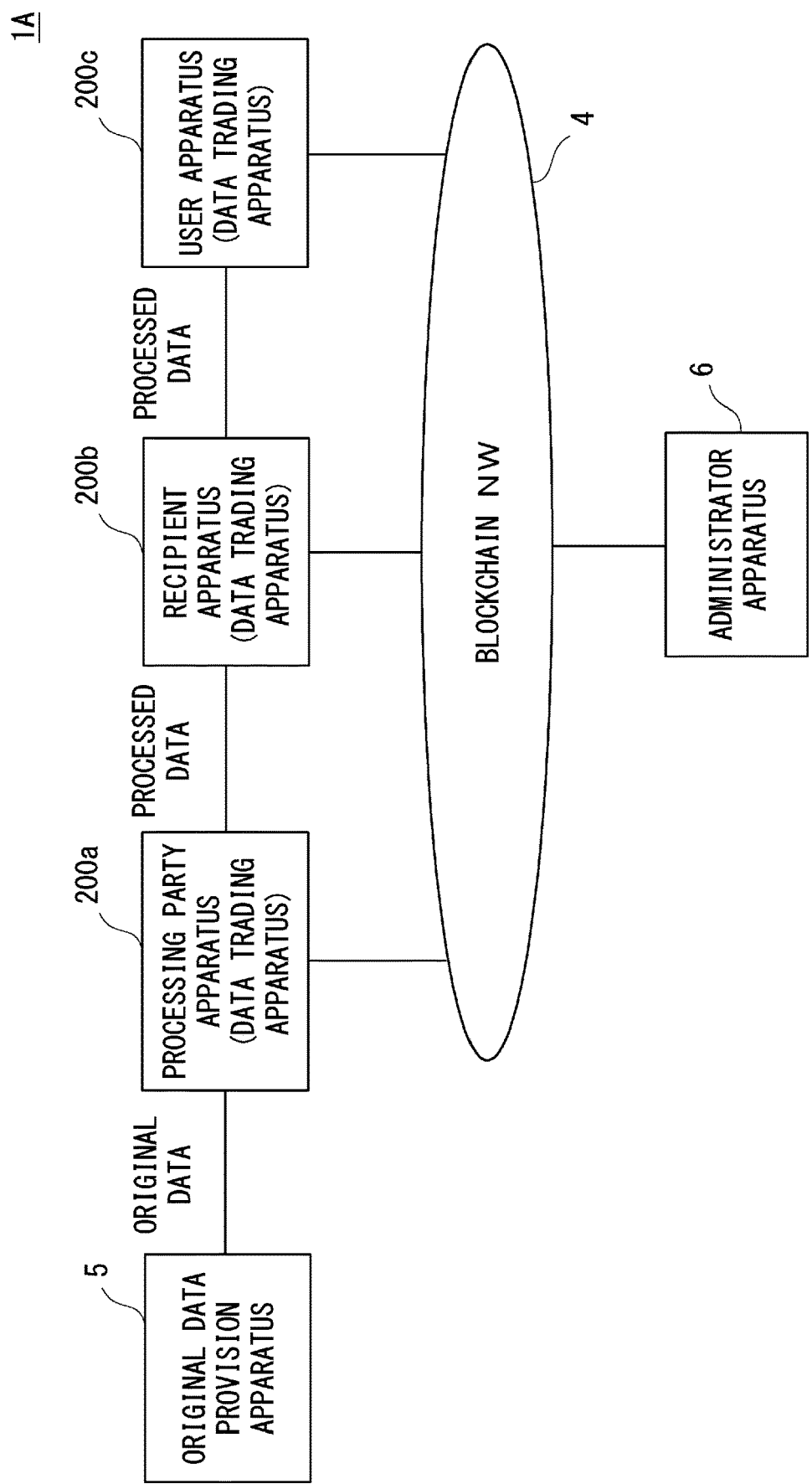
FIG. 3 is a diagram illustrating an example of the configuration of a data trading system according to a second example embodiment.

FIG. 3 is a diagram illustrating an example of the configuration of a data trading system 1A according to the second example embodiment. The data trading system 1A is a system where a plurality of business operators participate, and, in this system, the business operators process data and utilize the processed data for a specific business operation. The data trading system 1A illustrated in FIG. 3 includes a blockchain NW 4, an original data provision apparatus 5, a processing party apparatus 200a, a recipient apparatus 200b, a user apparatus 200c, and an administrator apparatus 6. Note that the processing party apparatus 200a, the recipient apparatus 200b, and the user apparatus 200c are examples of the data trading apparatus and may be referred to as the data trading apparatus 200. Although the blockchain BC is a consortium type in FIG. 3, the blockchain is not limited to such a type.

The original data provision apparatus 5 is an apparatus used by a business operator that provides original data. Although the original data provision apparatus 5 is not connected to the blockchain NW4 in FIG. 3, the original data provision apparatus 5 may be connected to the blockchain NW 4 and share the blockchain BC.

The processing party apparatus 200a is an apparatus used by a processing business operator that performs predetermined processing on the original data acquired from the original data provision apparatus 5. The processing party apparatus 200a provides processed data to the recipient apparatus 200b used by a business partner of the processing party apparatus 200a. In other words, the processing party apparatus 200a is equivalent to the primary-side data trading apparatus 100a.

The recipient apparatus 200b is an apparatus that utilizes (for example, views) the processed data acquired from the processing party apparatus 200a. In other words, the recipient apparatus 200b is equivalent to the secondary-side data trading apparatus 100b. The recipient apparatus 200b provides the processed data to the user apparatus 200c used by a business operator that is a business partner of the business operator of the recipient apparatus 200b.

The user apparatus 200c is an apparatus that utilizes the processed data acquired from the recipient apparatus 200b. In other words, the user apparatus 200c is also equivalent to the secondary-side data trading apparatus 100b.

For example, when the data trading system 1A is related to the business operation of biometric authentication or video analysis, the original data provision apparatus 5 provides data of a human face image, video, or biometric information to the processing party apparatus 200a. The processing party apparatus 200a then extracts a feature amount from the acquired data and generates learning data. The recipient apparatus 200b and the user apparatus 200c utilize the learning data to generate a learned model in relation to biometric authentication or video analysis.

Also, for example, when the data trading system 1A is related to manufacturing business operation, the original data provision apparatus 5 provides a manufacturing log or inspection log to the processing party apparatus 200a. The processing party apparatus 200a adds a logistics log to the acquired data to generate processed data. The recipient apparatus 200b and the user apparatus 200c utilize the processed data to prove the legitimacy of the manufacturing, inspection, and shipment of a product to the customer.

The administrator apparatus 6 is an apparatus that manages the blockchain BC shared through the blockchain NW 4.

Note that the original data provision apparatus 5 and the administrator apparatus 6 are not always required as components of the data trading system 1A.

Figure 4:
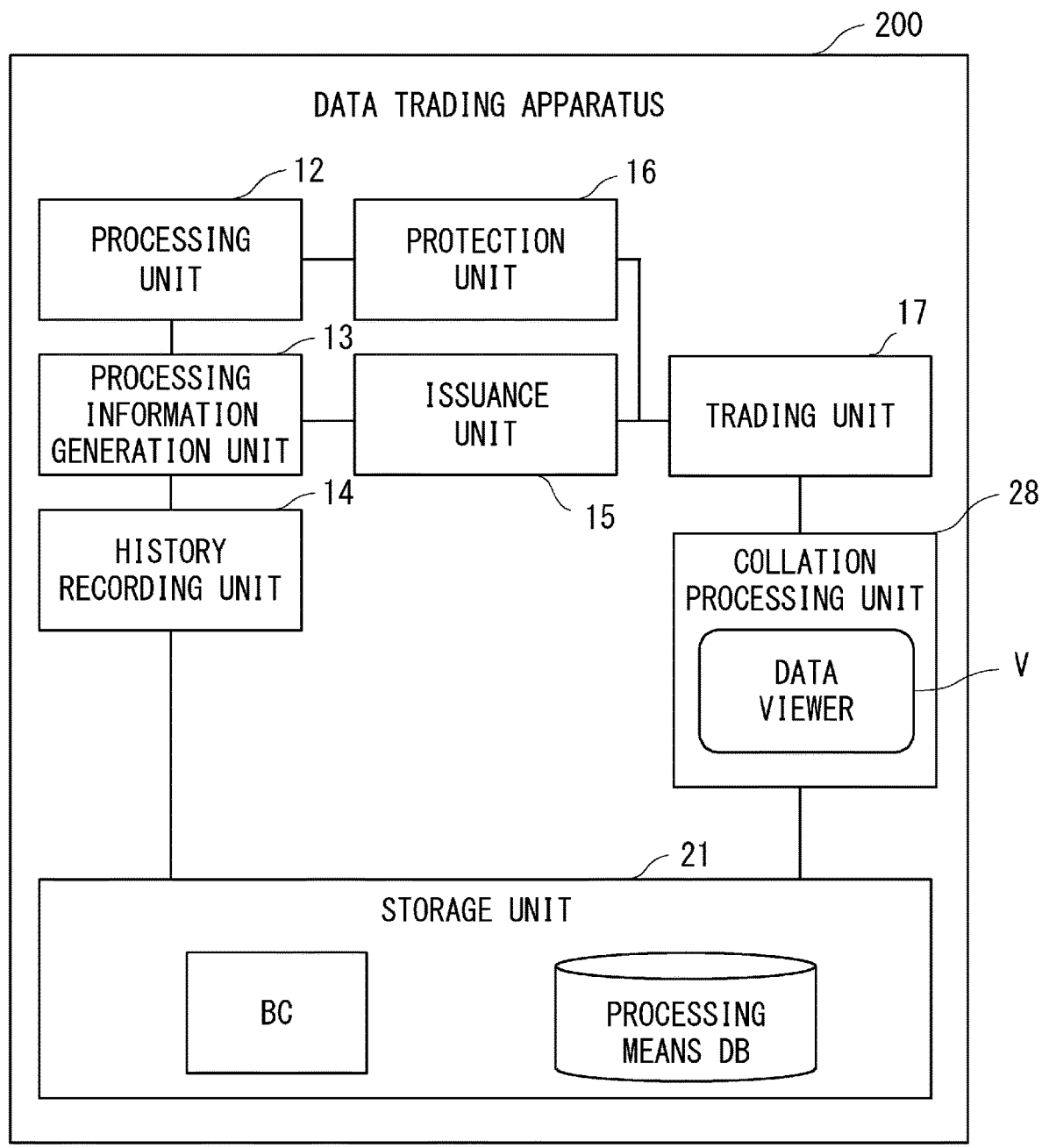
FIG. 4 is a block diagram illustrating the functional configuration of a data trading apparatus according to the second example embodiment.

FIG. 4 is a block diagram illustrating the functional configuration of the data trading apparatus 200 according to the second example embodiment.

The data trading apparatus 200 includes a storage unit 21, a processing unit 12, a processing information generation unit 13, a history recording unit 14, an issuance unit 15, a protection unit 16, a trading unit 17, and a collation processing unit 28. The processing unit 12, the processing information generation unit 13, the history recording unit 14, the issuance unit 15, and the protection unit 16 of the data trading apparatus 200 are similar to those of the primary-side data trading apparatus 100a. The trading unit 17 is similar to the primary-side trading unit 17a of the primary-side data trading apparatus 100a and the secondary-side trading unit 17b of the secondary-side data trading apparatus 100b.

The storage unit 21 stores a processing means database (DB) in addition to the blockchain BC. The processing means DB is a DB shared among nodes that share the blockchain BC through the blockchain NW 4 or another communication network. The processing means DB stores processing means information indicating the processing means used for processing. The processing means information may be a process used for processing or a program used for processing. The processing means DB may additionally store a permitted apparatus list. The permitted apparatus list is a list of the identification information of business operators that can use the processing means or the identification information of the apparatuses used by such business operators. Although the processing means DB is incorporated in the blockchain BC in the second example embodiment, the processing means DB is not limited to this configuration.

The processing unit 12 acquires the processing means information from the processing means DB and executes processing on the original data based on the processing means information. Note that the processing unit 12 may be configured to be able to perform processing only on the basis of the processing means information in the processing means DB. In other words, the processing unit 12 uses only legitimate processing means that is shared among the nodes. The processing unit 12 may also be configured to acquire processing means information only when the identification information of the data trading apparatus 200 is included in the permitted apparatus list. In other words, only a legitimate processing party can perform data processing. This makes it easier to prove the legitimacy of data processing.

The collation processing unit 28 includes a data viewer V in addition to the configuration and functions of the collation processing unit 18. The data viewer V is software for utilizing the processed data. In the second example embodiment, the protected processed data have a data format that is compatible only in the data viewer V. The data viewer V is also configured to be able to reference the blockchain BC of the storage unit 21.

The data viewer V unseals the protected processed data, performs the collation processing, and, when the processing information included in the processing certificate corresponds to the processing information recorded in the blockchain BC, removes the protection temporarily. The data viewer V then displays the content of the protected processed data to make it available for viewing. Additionally or alternatively, the data viewer V may audio-output the content of the protected processed data.

The collation processing unit 28 also executes predetermined processing when the processing information included in the processing certificate does not correspond to the processing information recorded in the blockchain BC. For example, when the processing information does not correspond, the collation processing unit 28 sends a notification of the collation result to the data trading apparatus of the data provision party (for example, the processing party apparatus 200a) or another apparatus capable of accessing the blockchain BC (for example, the administrator apparatus 6). In other words, the protected processed data are configured to require, when the processing information does not correspond, the operator to send a notification of the collation result. Additionally or alternatively, for example, when the processing information does not correspond, the collation processing unit 28 restricts use of the processed data by the data trading apparatus 200. In other words, the protection unit 16 applies protection to the processed data so that use of the processed data by the operator is restricted when the processing information does not correspond. Such processing by the collation processing unit 28 reduces the risk of using, distributing, and spreading illicitly tampered data. This processing may also act as a deterrent to data tampering. Note that the collation processing unit 28 may be configured to send a notification of the collation result to the data trading apparatus or another apparatus capable of accessing the blockchain BC, regardless of whether the processing information corresponds or not. In other words, the protected processed data are configured to require the operator to send a notification of the collation result in response to unsealing operation of the data. This case also provides a similar effect since the apparatus to which the notification is sent can recognize use of the data that have been illicitly tampered with.

Note that the collation processing unit 28 may record the collation result in the storage unit 21, regardless of whether the processing information corresponds or not. The apparatus that has received the notification of the collation result may also record the collation result in the storage unit. The information of the collation result recorded in this way can be used for other purposes, such as, as a basic material when receiving an audit.

Figure 5:
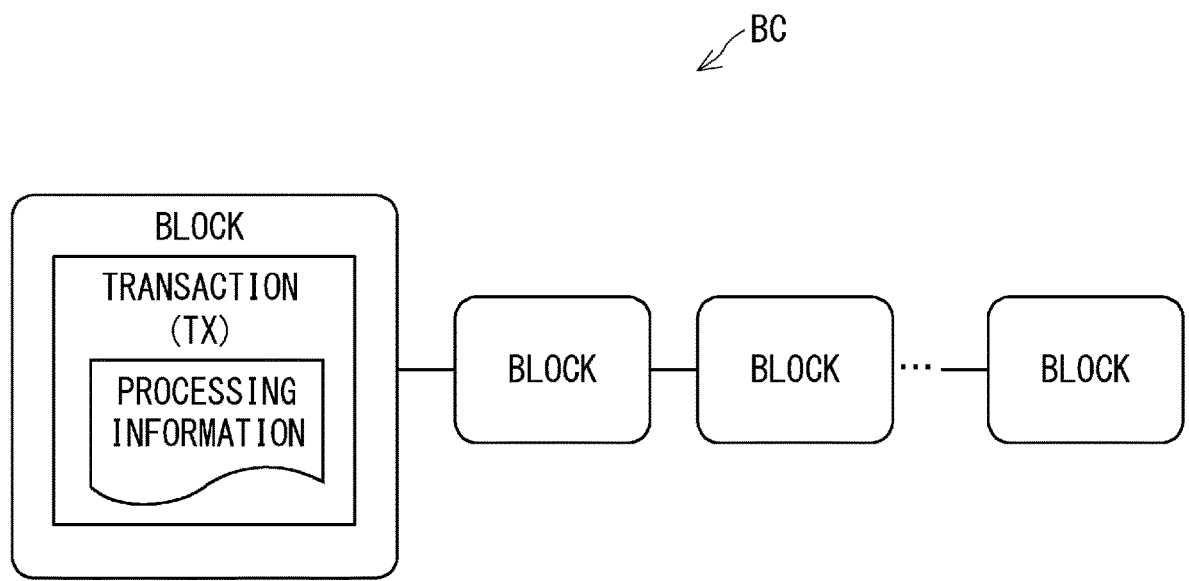
FIG. 5 is a diagram illustrating an example of a blockchain according to the second example embodiment.

FIG. 5 is a diagram illustrating an example of the blockchain BC according to the second example embodiment. The blocks of the blockchain BC have TXs including processing information, and blocks are joined in a chronological sequence. Although one TX is included in one block in FIG. 5, a plurality of TXs may be included in one block.

Figure 6:
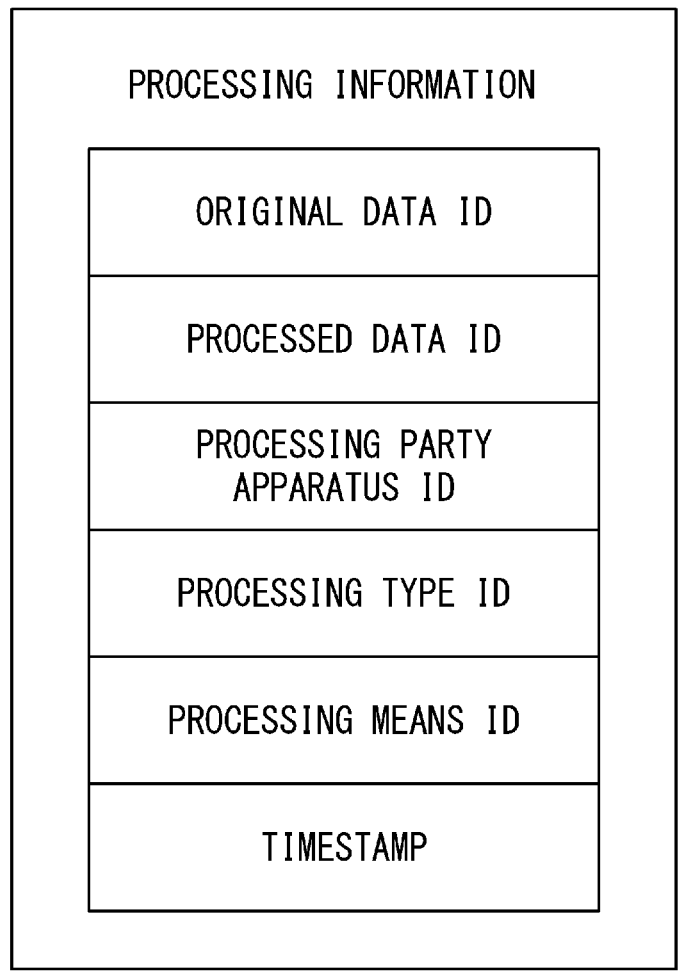
FIG. 6 is a diagram illustrating an example of the data structure of processing information according to the second example embodiment.

FIG. 6 is a diagram illustrating an example of the data structure of the processing information according to the second example embodiment. The processing information includes the identification information (ID) of the original data, the ID of the processed data, the ID of the processing party apparatus (in this example, the processing party apparatus 200a), the ID of the processing type, the ID of the processing means in the processing means DB, and a timestamp indicating the date and time when the processing was carried out. The processing type indicates the type of processing content such as deletion of data, masking, and image blurring. Note that the processing information may include the ID of the processing party instead of or in addition to the ID of the processing party apparatus.

Figure 7:
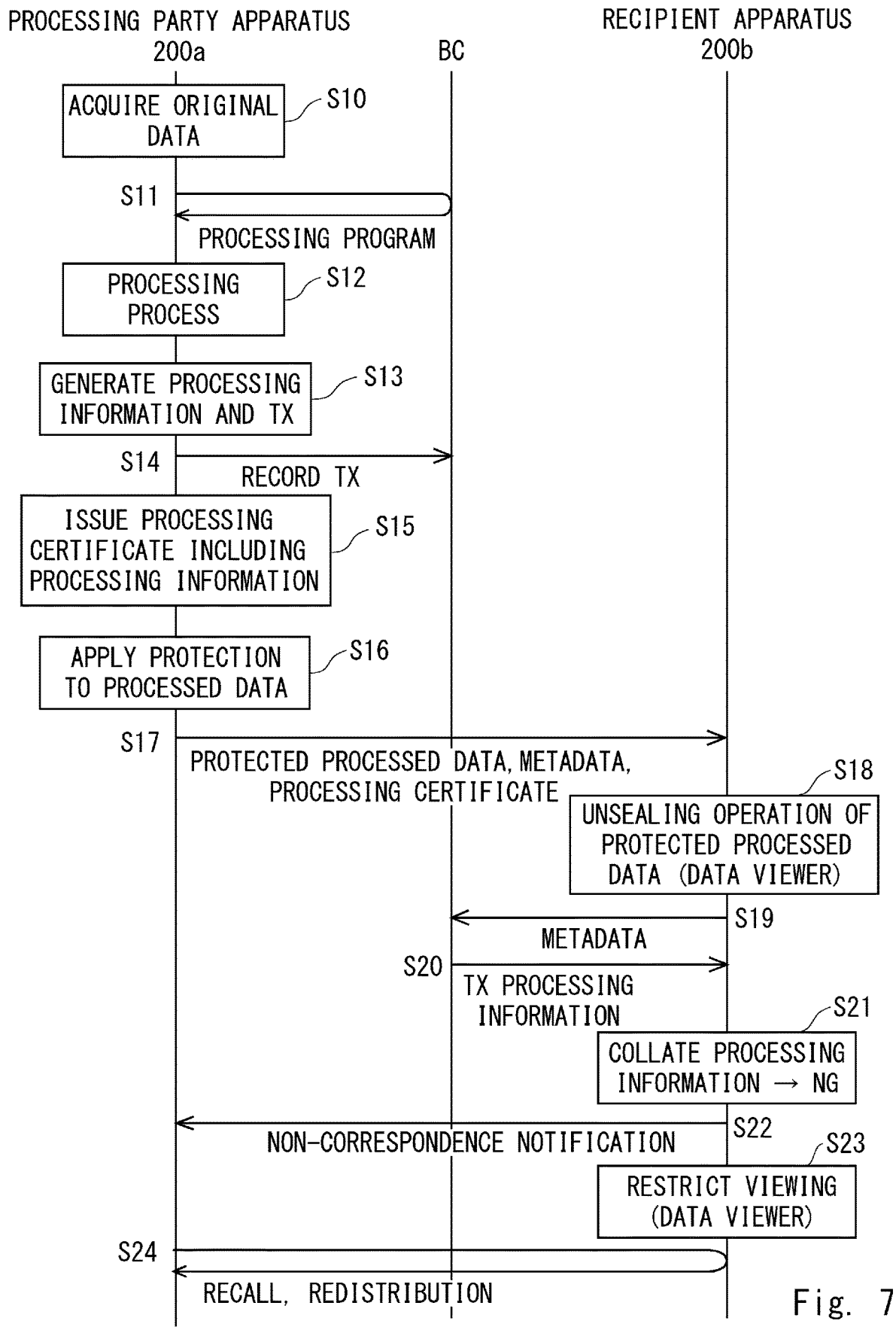
FIG. 7 is a sequence diagram illustrating an example of the processing procedure of the data trading system according to the second example embodiment.

FIG. 7 is a sequence diagram illustrating an example of the processing procedure of the data trading system 1A according to the second example embodiment. FIG. 7 illustrates a sequence when processed data are provided from the processing party apparatus 200a to the recipient apparatus 200b.

First, the processing unit 12 of the processing party apparatus 200a acquires original data (step S10). Then, the processing unit 12 of the processing party apparatus 200a acquires a processing program from the processing means DB of the storage unit 21 as processing means information (step S11). Next, the processing unit 12 of the processing party apparatus 200a processes the original data using the processing program to generate processed data (step S12). The processing unit 12 of the processing party apparatus 200a supplies the processed data to the protection unit 16.

Subsequently, the processing information generation unit 13 of the processing party apparatus 200a generates the processing information and generates a first TX including the processing information (step S13). The processing information generation unit 13 of the processing party apparatus 200a then supplies the processing information to the issuance unit 15 and the first TX to the history recording unit 14. Next, the history recording unit 14 of the processing party apparatus 200a records the first TX in the blockchain BC (step S14). The issuance unit 15 of the processing party apparatus 200a generates and issues a processing certificate based on the processing information (step S15). Step S15 may be performed prior to or in parallel to step S14. The issuance unit supplies the processing certificate to the trading unit 17.

Whereas, the protection unit 16 of the processing party apparatus 200a applies protection to the processed data, that is, converts the data format of the processed data to be used only in the data viewer V (step S16). As a result, the protection unit 16 generates the protected processed data. Note that the protection unit 16 of the processing party apparatus 200a generates information necessary to access the first TX recorded in the blockchain BC as metadata of the protected processed data. The protection unit 16 supplies the protected processed data and metadata to the trading unit 17.

Subsequently, the trading unit 17 of the processing party apparatus 200a packages the protected processed data, metadata, and processing certificate and transmits the package to the trading unit 17 of the recipient apparatus 200b (step S17). Note that, when the recipient apparatus 200b does not have the data viewer V, the trading unit 17 of the processing party apparatus 200a may transmit data packaged with the software of the data viewer V in addition to the protected processed data, metadata, and processing certificate. The trading unit 17 of the recipient apparatus 200b supplies the acquired data to the collation processing unit 28.

The collation processing unit 28 of the recipient apparatus 200b performs an unsealing operation of the protected processed data on the data viewer V (step S18). In response to the unsealing operation, the collation processing unit 28 of the recipient apparatus 200b uses the metadata to access the first TX in the blockchain BC (step S19) and acquires the processing information included in the first TX (step S20). Then, the collation processing unit 28 of the recipient apparatus 200b collates the processing information recorded in the blockchain BC with the processing information included in the processing certificate (step S21). When the processing information corresponds (in this case, matches), the collation processing unit 28 of the recipient apparatus 200b temporarily unprotects the protected processed data and displays the processed data on the data viewer V. In this case, the collation processing unit 28 of the recipient apparatus 200b may record the collation result in the storage unit 21. The collation processing unit 28 of the recipient apparatus 200b may then send a notification of the collation result to the processing party apparatus 200a or the administrator apparatus 6.

In the present example, it is assumed that both processing information does not correspond.

In this case, the collation processing unit 28 of the recipient apparatus 200b transmits a non-correspondence notification to the processing party apparatus 200a indicating that the processing information does not correspond (step S22). Furthermore, the collation processing unit 28 of the recipient apparatus 200b maintains the protection of the protected processed data and restricts the viewing of the processed data on the data viewer V (step S23).

Upon receipt of the non-correspondence notification, the processing party apparatus 200a sends a recall or deletion request for the package to the recipient apparatus 200b and redistributes the package (step S24).

Note that, in response to the acquisition of the processing means information, such as a processing program, from the processing means DB at step S11, the processing unit 12 of the processing party apparatus 200a may generate a TX including information about the acquisition history of the processing means information. The processing unit 12 of the processing party apparatus 200a may then record the generated TX in the blockchain BC through the history recording unit 14. This makes it easy to prove the legitimacy of the processing means.

Figure 8:
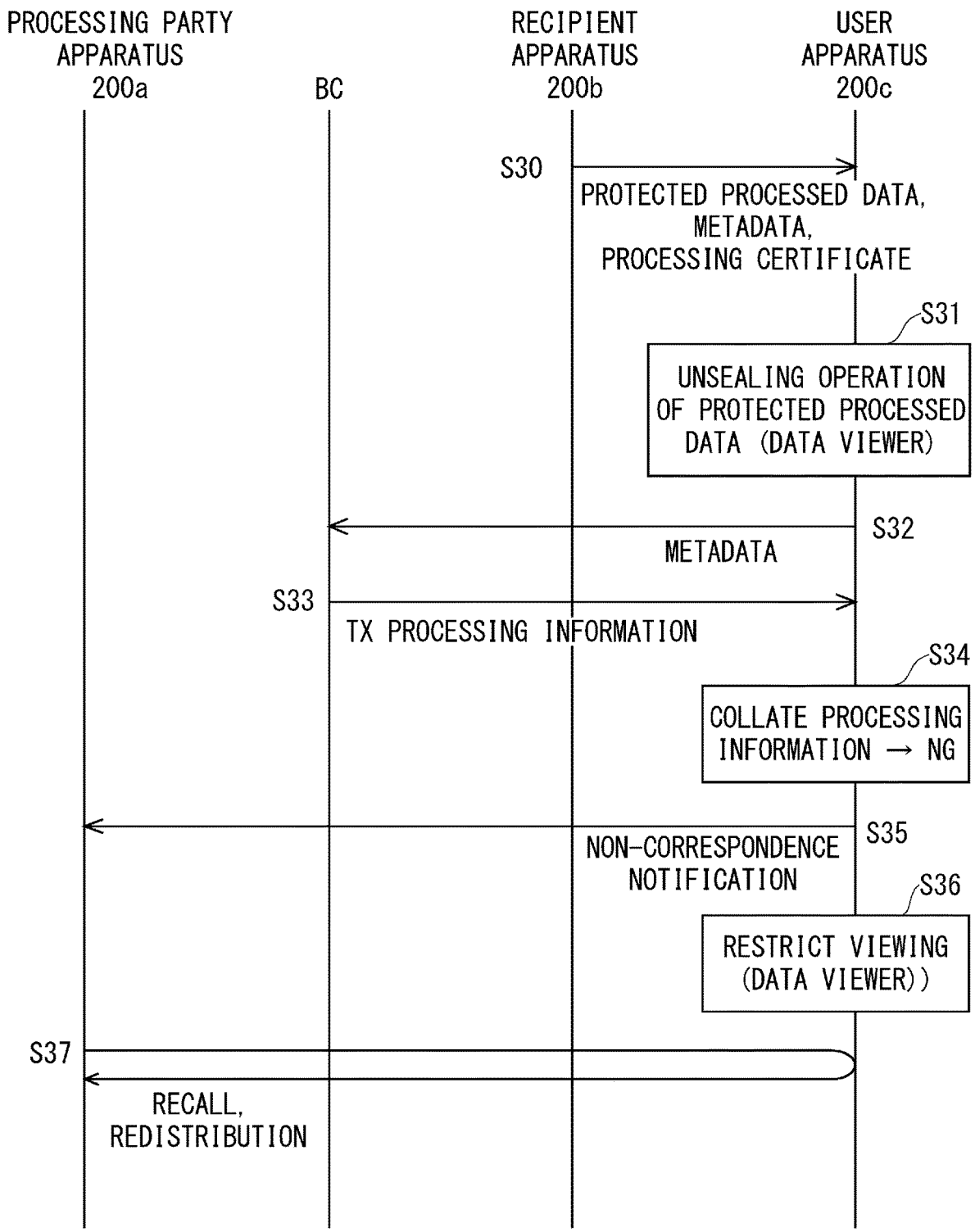
FIG. 8 is a sequence diagram illustrating an example of the processing procedure of the data trading system according to the second example embodiment.

FIG. 8 is a sequence diagram illustrating an example of the processing procedure of the data trading system 1A according to the second example embodiment. FIG. 8 illustrates a sequence when the protected processed data are provided from the processing party apparatus 200a to the recipient apparatus 200b, and then the protected processed data are provided from the recipient apparatus 200b to the user apparatus 200c.

The trading unit 17 of the recipient apparatus 200b transmits a package including the protected processed data, metadata, and processing certificate to the trading unit 17 of the user apparatus 200c (step S30).

The collation processing unit 28 of the user apparatus 200c performs an unsealing operation of the protected processed data on the data viewer V (step S31) in a similar manner to step S18 of FIG. 7. In response to the unsealing operation, the collation processing unit 28 of the user apparatus 200c uses the metadata to access the first TX in the blockchain BC (step S32) and acquires the processing information included in the first TX (step S33). The collation processing unit 28 of the user apparatus 200c then collates the processing information in a similar manner to step S21 of FIG. 7 (step S34).

In this example, it is also assumed that both processing information does not correspond.

Similar to steps S22 and S23 of FIG. 7, the collation processing unit 28 of the user apparatus 200c transmits a non-correspondence notification to the processing party apparatus 200a (step S35) and restricts viewing of the processed data on the data viewer V (step S36).

Upon receipt of the non-correspondence notification, the processor apparatus 200a sends a recall or deletion request for the package to the user apparatus 200c and redistributes the package (step S37).

Thus, if the processing history of the processed data cannot be proven to be legitimate upon unsealing of the data, the data trading system 1A of the second example embodiment sends a notification to an apparatus capable of accessing the blockchain BC or restricts use of the processed data by the operator of the unsealing operation. Therefore, it is possible to deter illicit data tampering in the process of processing and distribution of the data, as well as, reduce the risk of using, distributing, and spreading illicitly tampered data.

Note that the processing party apparatus provides information for accessing information necessary for the collation processing as metadata to the recipient apparatus, which facilitates the collation processing by the recipient apparatus.

THIRD EXAMPLE EMBODIMENT

Next, a third example embodiment of the present disclosure is described with reference to FIGS. 9 to 13. The third example embodiment is characterized in that the apparatus within the data trading system can trace the use history of the processed data.

Figure 9:
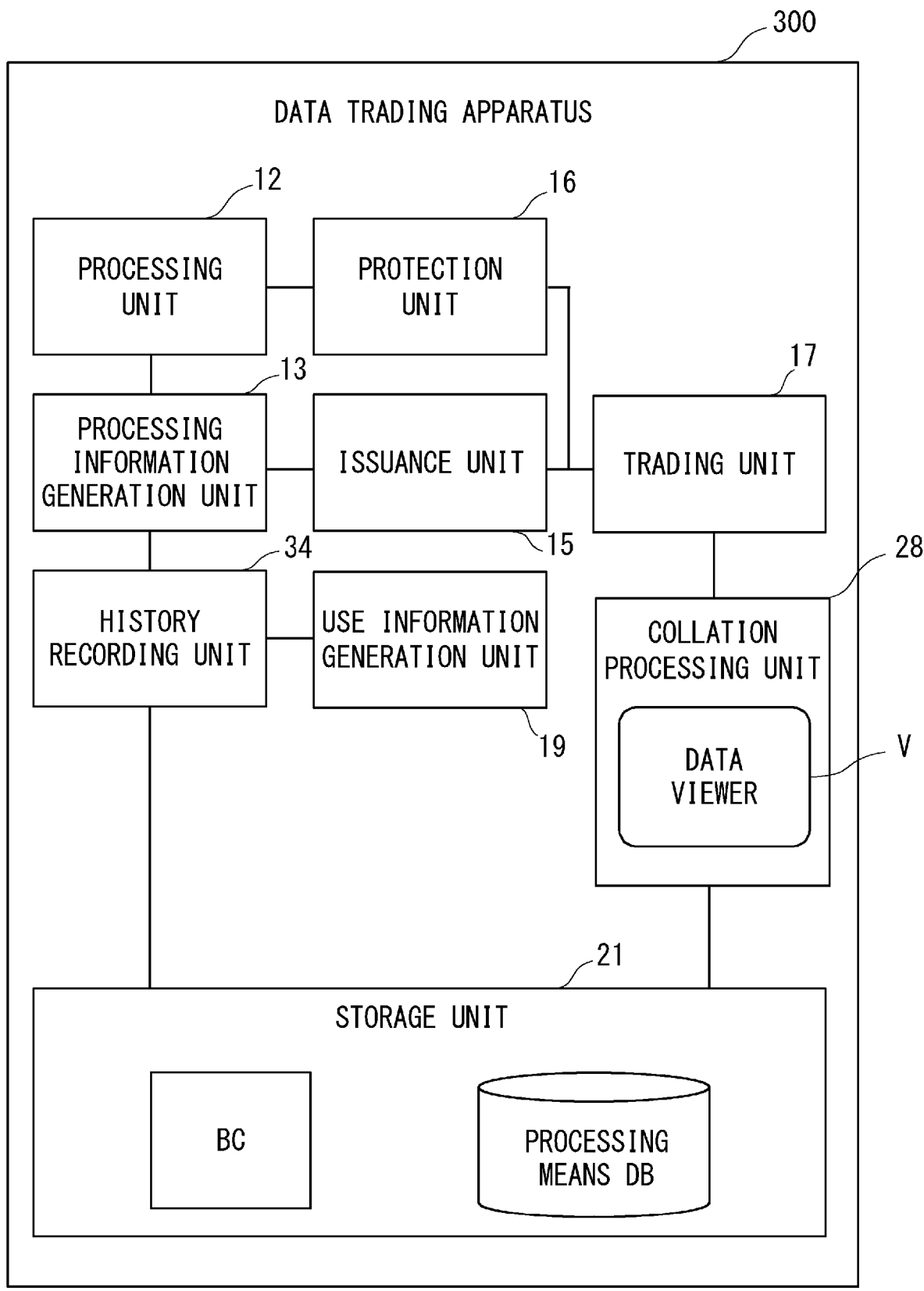
FIG. 9 is a block diagram illustrating the functional configuration of a data trading apparatus according to a third example embodiment.

FIG. 9 is a block diagram illustrating the functional configuration of the data trading apparatus 300 according to the third example embodiment. The data trading apparatus 300 according to the third example embodiment has substantially similar configuration and functions as the data trading apparatus 200 according to the second example embodiment. However, the data trading apparatus 300 differs from the data trading apparatus 200 in that the data trading apparatus 300 has a use information generation unit 19 and a history recording unit 34 instead of the history recording unit 14.

The use information generation unit 19 generates, in response to use of the processed data by the data trading apparatus 300, use information indicating the use history of the processed data and generates a second TX including the use information. In the third example embodiment, the use information includes collation information indicating that collation processing of the processing information has been carried out with regard to the processed data.

In addition to the function of the historical recording unit 14, the historical recording unit 34 records, in response to generation of the second TX by the use information generation unit 19, the second TX in the blockchain BC in association with the first TX with regard to the processed data subject to the use.

Figure 10:
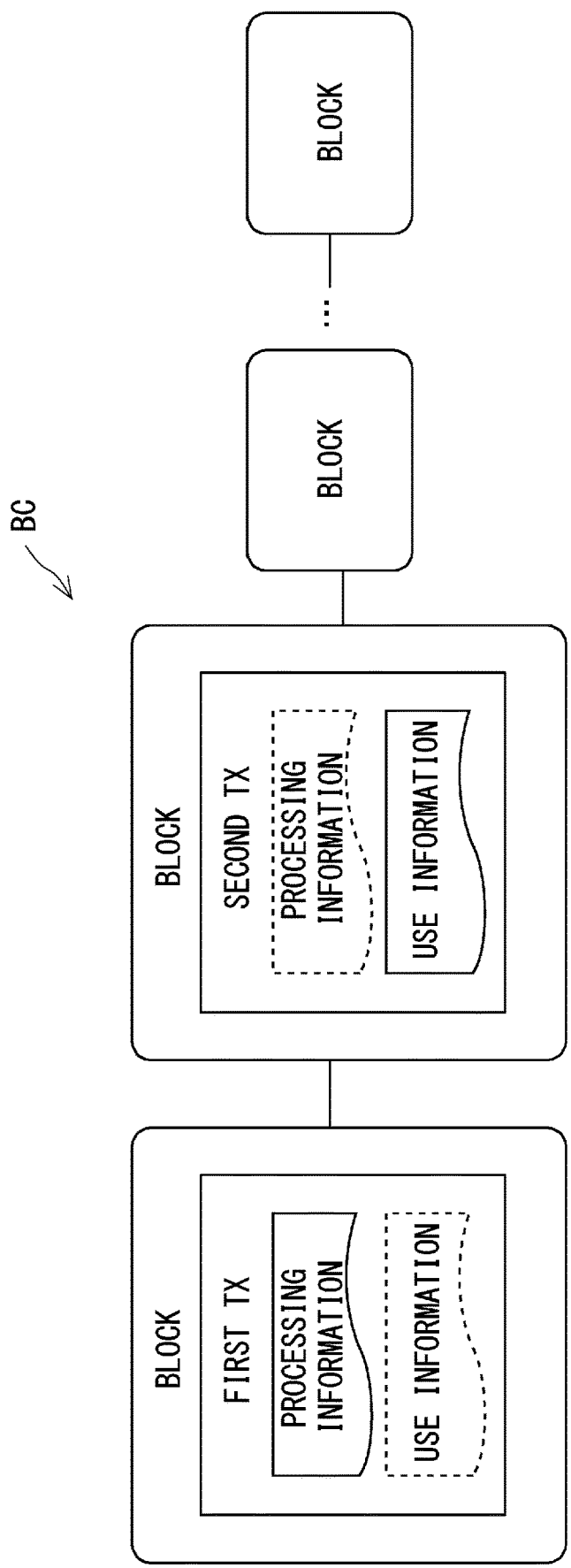
FIG. 10 is a diagram illustrating an example of a blockchain according to the third example embodiment.

FIG. 10 is a diagram illustrating an example of the blockchain BC according to the third example embodiment. The TX records at least one of the processing information and the use information. In FIG. 10, the processing information is recorded in the first TX, and the use information of the processed data of the processing information is recorded in the second TX associated with the first TX. Note that the second TX may record processing information similar to the processing information recorded in the first TX.

Figure 11:
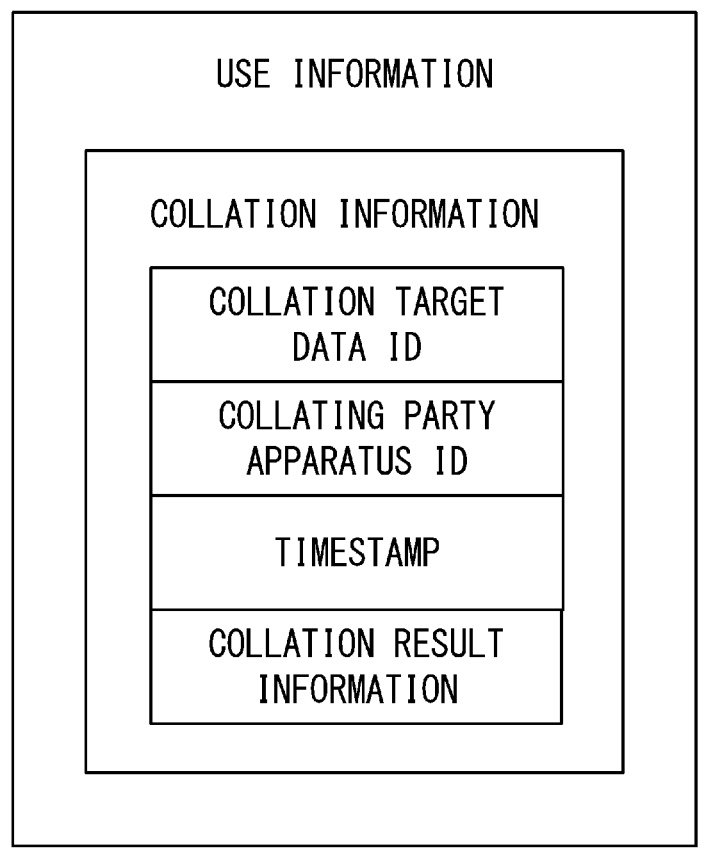
FIG. 11 is a diagram illustrating an example of the data structure of use information according to the third example embodiment.

FIG. 11 is a diagram illustrating an example of the data structure of the use information according to the third example embodiment. As described above, the use information includes collation information in the third example embodiment. For example, the collation information includes the ID of the collation target data, the ID of the collating party apparatus, a timestamp indicating the date and time when the collation processing was carried out, and collation result information indicating whether the collated information corresponds. Note that the collation target data are the same as the processed data of the processing information included in the associated first TX, and the collating party apparatus indicates an apparatus to which the processed data are provided.

Figure 12:
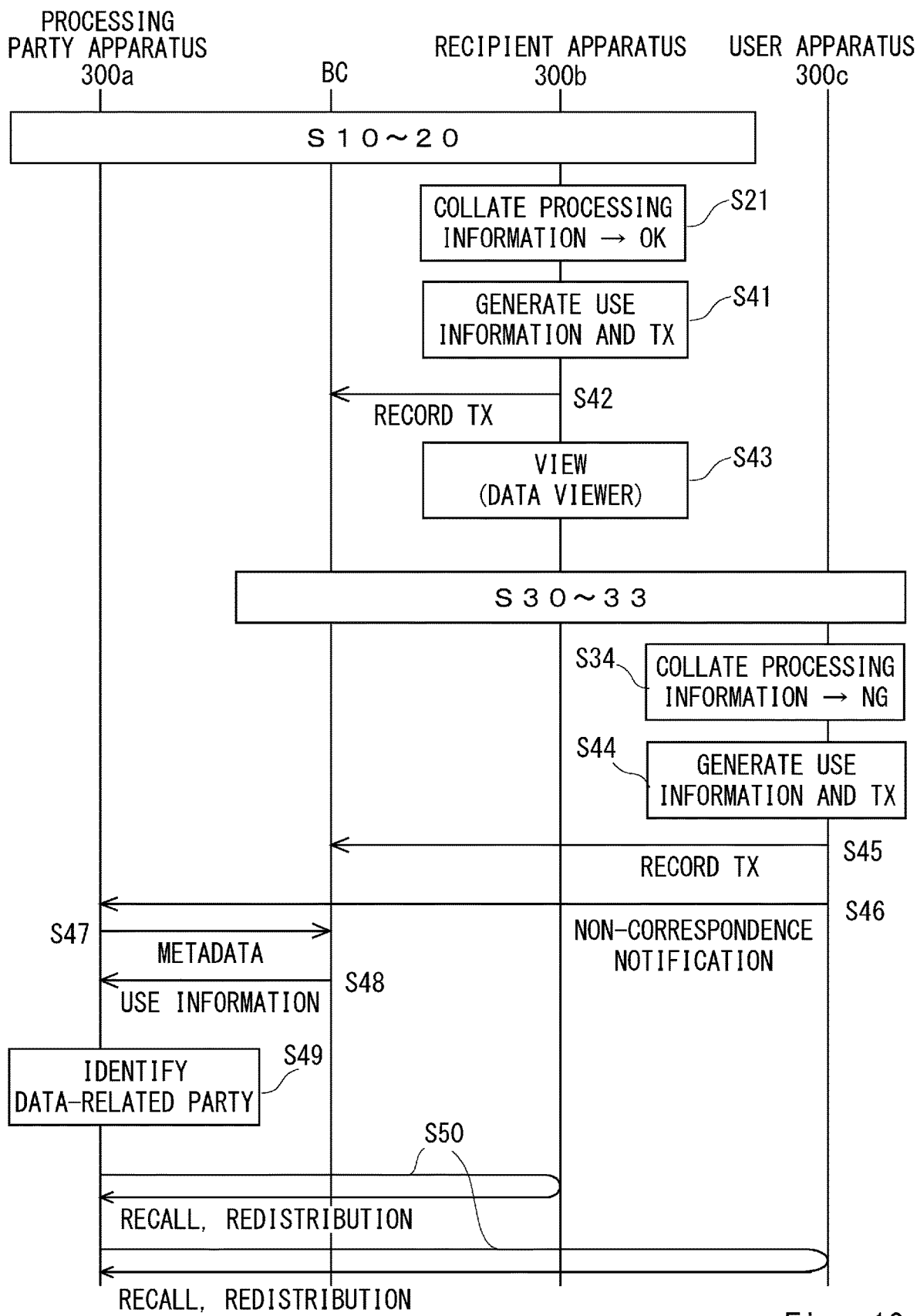
FIG. 12 is a sequence diagram illustrating an example of the processing procedure of the data trading system according to the third example embodiment.

FIG. 12 is a sequence diagram illustrating an example of the processing procedure of the data trading system 1B according to the third example embodiment. The data trading system 1B differs from the data trading system 1A in that the data trading system 1B includes a processing party apparatus 300a, a recipient apparatus 300b, and a user apparatus 300c, instead of the processing party apparatus 200a, the recipient apparatus 200b, and the user apparatus 200c.

First, the data trading system 1B performs similar processing to steps S10 to 20 in FIG. 7. The collation processing unit 28 of the recipient apparatus 300b then collates the processing information (step S21). Here, it is assumed that both processing information corresponds.

The use information generation unit 19 of the recipient apparatus 300b generates, in response to the collation processing performed by the collation processing unit 28, use information and a second TX (step S41). The history recording unit 34 of the recipient apparatus 300b records the second TX in the blockchain BC in association with the first TX (step S42). At this time, the history recording unit 34 may access the first TX and perform recording processing using the metadata of the protected processed data.

The collation processing unit 28 of the recipient apparatus 200b then displays the processed data on the data viewer V to make it available for viewing (step S43).

Next, the data trading system 1B performs similar processing to steps S30 to 33 in FIG. 8. The collation processing unit 28 of the user apparatus 300c then collates the processing information (step S34). Here, it is assumed that both processing information does not correspond.

The use information generation unit 19 of the user apparatus 300c generates, in response to the collation processing performed by the collation processing unit 28, use information and a third TX (step S44). The history recording unit 34 of the user apparatus 300c records the third TX in the blockchain BC in association with the second TX (step S45). In other words, the third TX is associated with the first TX through the second TX.

The collation processing unit 28 of the user apparatus 300c also transmits a non-correspondence notification to the processing party apparatus 300a (step S46).

Upon receipt of the non-correspondence notification, the processing party apparatus 300a uses the metadata (step S47) to acquire the use information included in all TXs associated with the first TX in the blockchain BC (step S48). The processing party apparatus 300a then identifies a data-related party that used the data (in this example, including a party that attempted to collate the processing information) (step S49) and performs a recall and redistribution to the data-related party (step S50).

Although the use information is assumed to include collation information in the above example, the use information may additionally or alternatively include viewing information indicating that the processed data have been viewed and trading information indicating that the processed data have been traded.

Figure 13:
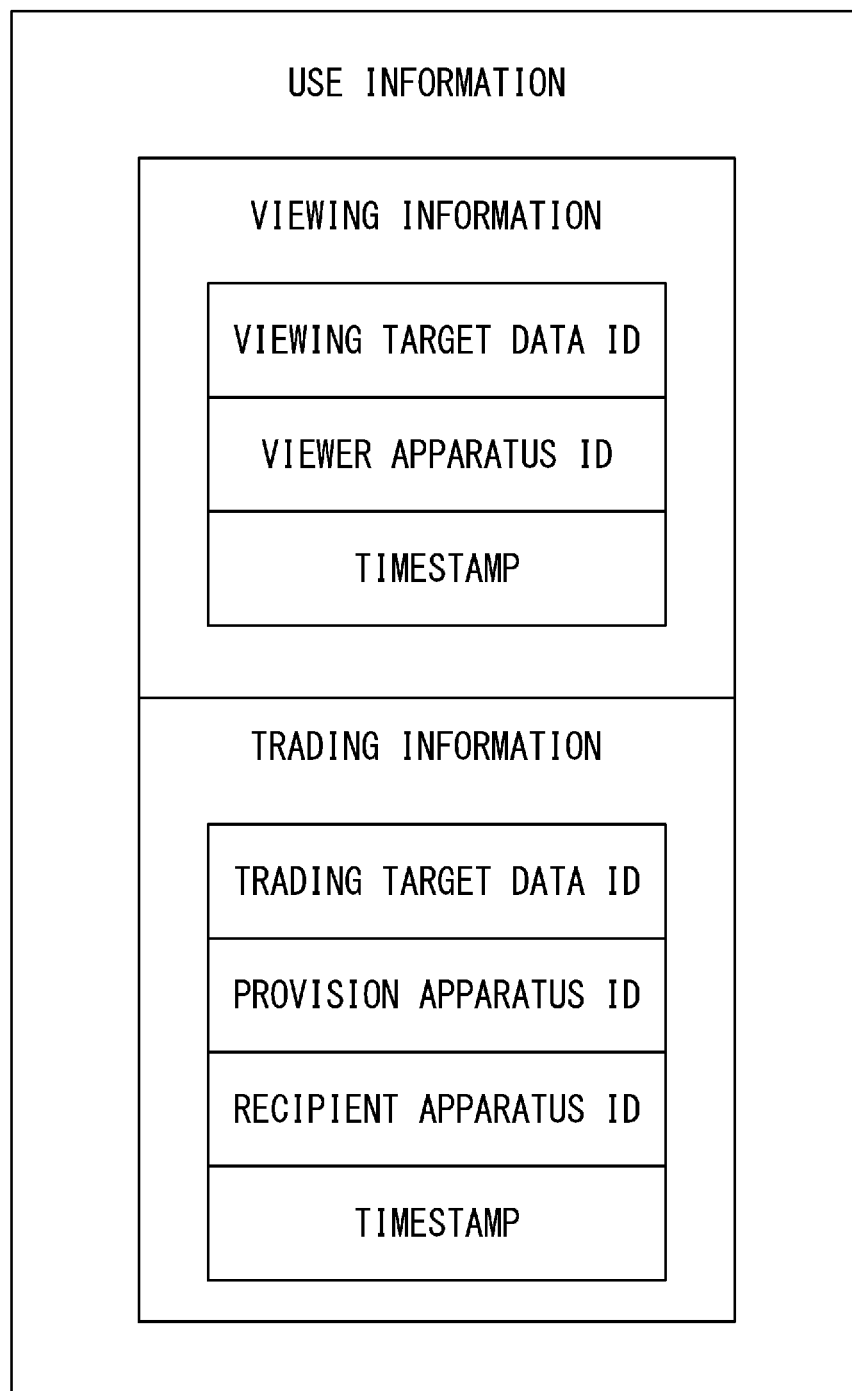
FIG. 13 is a diagram illustrating another example of the data structure of the use information according to the third example embodiment.

FIG. 13 is a diagram illustrating another example of the data structure of the use information according to the third example embodiment. For example, the viewing information included in the use information includes the ID of the viewing target data, the ID of the viewer apparatus, and a timestamp indicating the date and time when the data are viewed. Note that the viewing target data are the same as the processed data of the processing information included in the associated TX.

The viewing information is generated in response to the processed data being made available for viewing. Accordingly, after step S43 of FIG. 12, processing equivalent to steps S41 and 42 is executed.

The trading information included in the use information includes, for example, the ID of the trading target data, the ID of the provision apparatus, the ID of the recipient apparatus, and a timestamp indicating the date and time when the trading was carried out. Note that the trading target data are the same as the processed data of the processing information included in the associated TX.

The trading information may be generated by the recipient apparatus in response to receiving a package including the protected processed data. Accordingly, processing equivalent to steps S41 and 42 may be performed between steps S17 and S18 and between steps S30 and S31 of FIG. 12. Alternatively, the trading information may be generated by the provision apparatus in response to transmission of the protected processed data by the provision apparatus.

In this manner, the data trading system 1B according to the third example embodiment records the use history of the processed data in the blockchain BC so that an apparatus in the system can trace the use history of the processed data. This makes it easy for an apparatus in the system to determine the extent of the spread of illicitly tampered data. The information of the use history recorded in this way can also be utilized for other purposes, such as being used as basic information when receiving an audit. Note that the third example embodiment provides a similar effect to the second example embodiment.

FOURTH EXAMPLE EMBODIMENT

Next, a fourth example embodiment of the present disclosure is described with reference to FIGS. 14 and 15. The fourth example embodiment is characterized in that use of the processed data by an operator is restricted based on the use history of the processed data.

Figure 14:
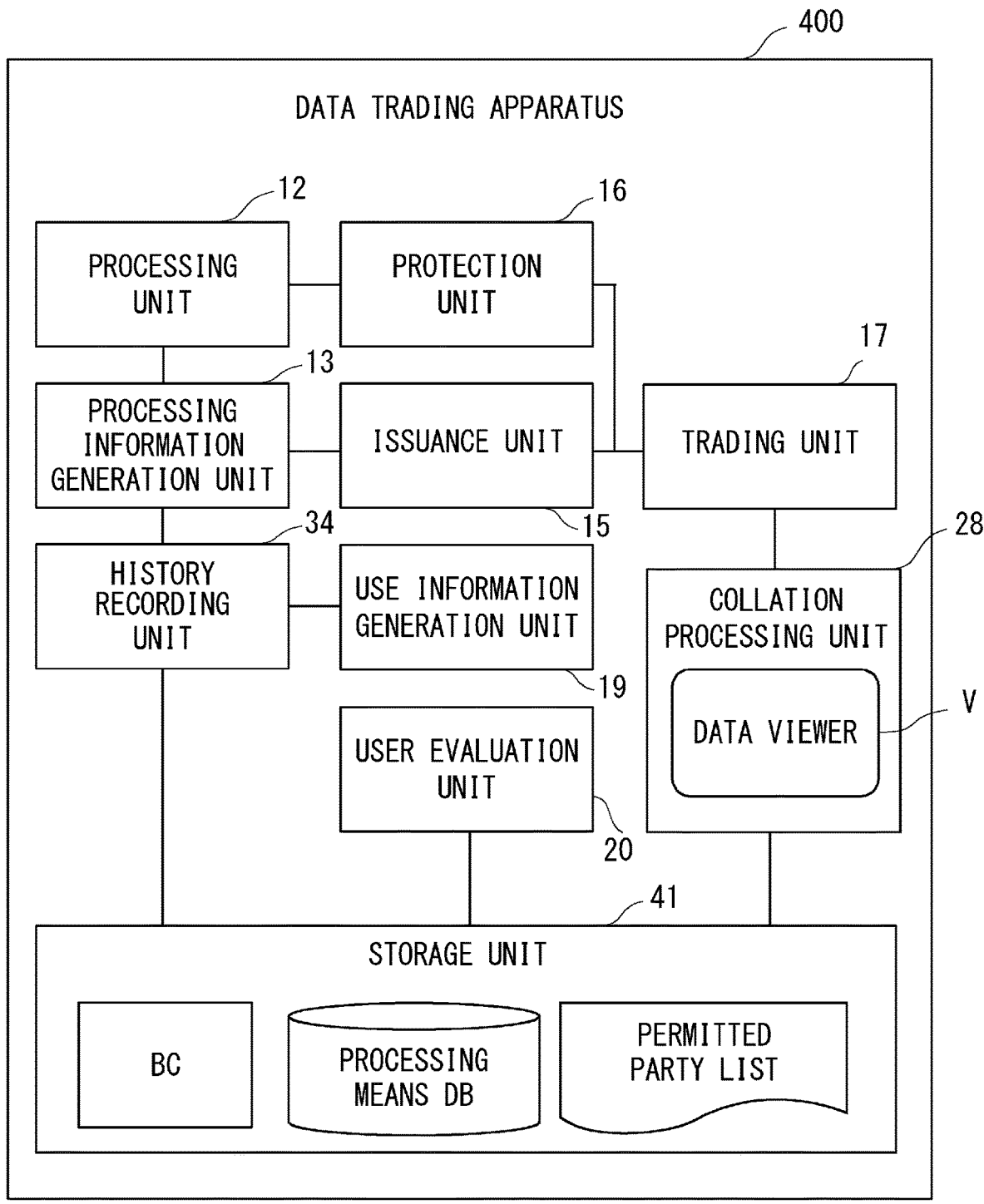
FIG. 14 is a block diagram illustrating the functional configuration of a data trading apparatus according to a fourth example embodiment.

FIG. 14 is a block diagram illustrating the functional configuration of the data trading apparatus 400 according to the fourth example embodiment. The data trading apparatus 400 according to the fourth example embodiment has substantially similar configuration and functions as the data trading apparatus 300 according to the third example embodiment. However, the data trading apparatus 400 differs from the data trading apparatus 300 in that the data trading apparatus 400 has a storage unit 41, instead of the storage unit 21, and a user evaluation unit 20.

The storage unit 41 stores a permitted party list in addition to the blockchain BC and the processing means DB. The permitted party list is a list of apparatuses that can use the processed data and registers the identification information of the apparatuses that can use the processed data in association with the ID of the processed data. The permitted party list may be created in advance based on the matters agreed upon at the time of the contract of trading.

The user evaluation unit 20 performs the following processing when the permitted party list is stored in the storage unit 41.

First, the user evaluation unit 20 acquires user identification information that is the identification information of the apparatus that used the processed data (collating party apparatus ID, viewer apparatus ID, and/or recipient apparatus ID) from the second TX that is recorded in the blockchain BC in association with the first TX. Then, the user evaluation unit 20 determines whether or not the acquired user identification information is included in the permitted party list.

Note that the user evaluation unit 20 may transmit a control signal to permit or restrict use of the processed data in the data viewer V by the operator according to the determination result.

Figure 15:
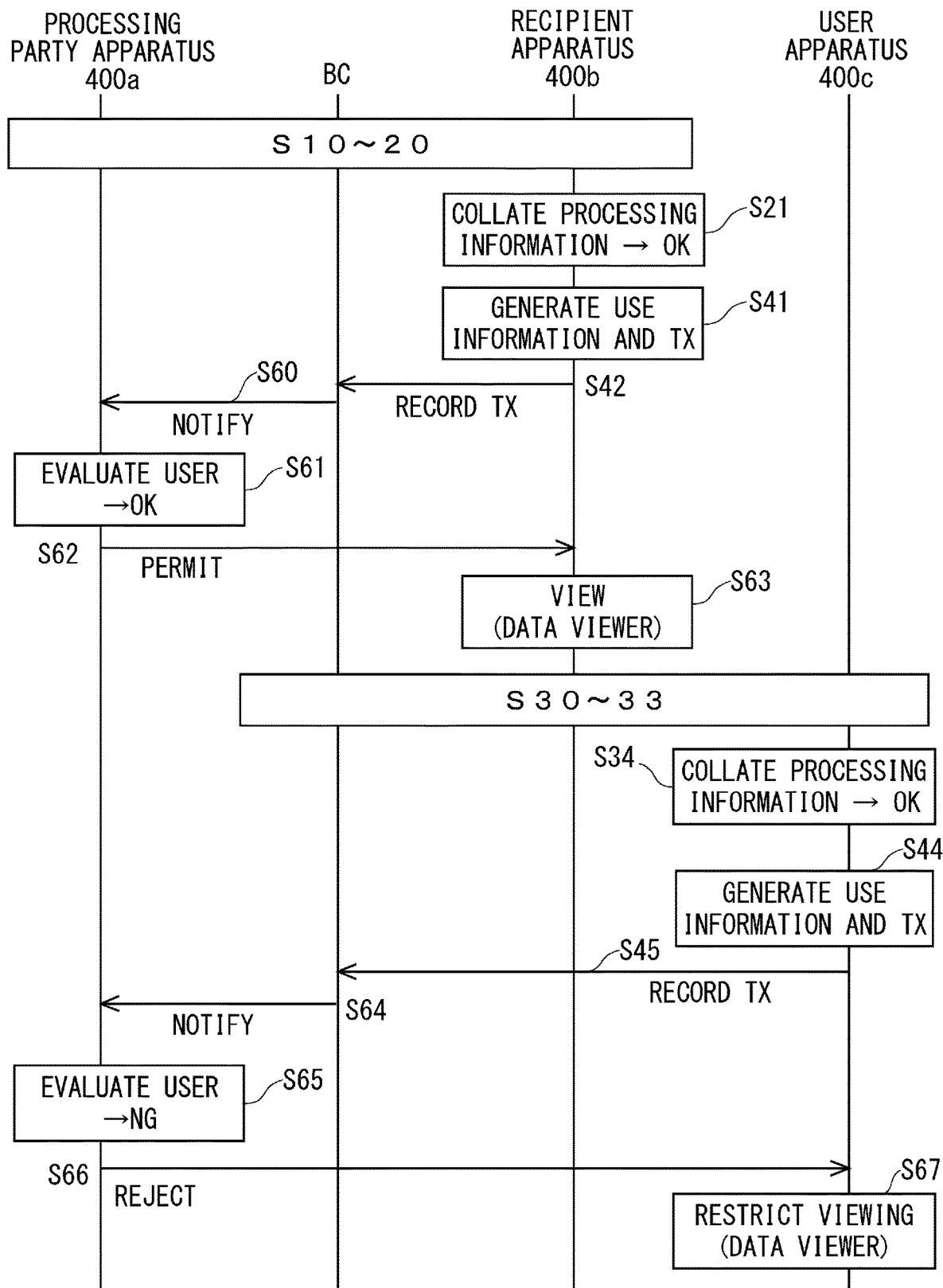
FIG. 15 is a sequence diagram illustrating an example of the processing procedure of the data trading system according to the fourth example embodiment.

FIG. 15 is a sequence diagram illustrating an example of the processing procedure of the data trading system 1C according to the fourth example embodiment. The data trading system 1C differs from the data trading system 1C in that it includes a processing party apparatus 400a, a recipient apparatus 400b, and a user apparatus 400c instead of the processing party apparatus 300a, the recipient apparatus 300b, and the user apparatus 300c. Note that the permitted party list is assumed to be stored only in the storage unit 41 of the processing party apparatus 400a.

First, the data trading system 1C performs similar processing to the steps S10 to S20. Then, the recipient apparatus 400b collates the processing information (step S21), generates use information and a second TX (step S41), and records the second TX in the blockchain BC (step S42). Accordingly, the processing party apparatus 400a is notified that the second TX has been recorded in the blockchain BC (step S60).

Subsequently, the user evaluation unit 20 of the processing party apparatus 400a refers to the permitted party list of the storage unit 41 and determines whether or not the collating party apparatus ID of the second TX is included in the permitted party list (step S61). Here, the collating party apparatus ID is assumed to be included in the permitted party list. The user evaluation unit 20 of the processing party apparatus 400a transmits a control signal to permit use of the processed data in the data viewer V to the recipient apparatus 400b (step S62).

The collation processing unit 28 of the recipient apparatus 400b displays, in response to the receipt of the control signal for use permission, the processed data on the data viewer V and made it available for viewing (step S63).

Then, the data trading system 1C performs similar processing to steps S30 to S33.

The collation processing unit 28 of the user apparatus 400c then collates the processing information (step S34). Here, it is assumed that both processing information corresponds. The user apparatus 400c generates use information and a third TX (step S44) and records the third TX in the blockchain BC (step S45). Accordingly, the processing party apparatus 400a is notified that the third TX has been recorded in the blockchain BC (step S64).

Subsequently, the user evaluation unit 20 of the processing party apparatus 400a determines whether or not the collating party apparatus ID of the third TX is included in the permitted party list (step S65). Here, the collating party apparatus ID is assumed to be not included in the permitted party list. The user evaluation unit 20 of the processing party apparatus 400a rejects use of the processed data in the data viewer V by the user apparatus 400c and transmits a control signal to restrict use of the processed data (step S66).

The collation processing unit 28 of the user apparatus 400c restricts, in response to the receipt of the control signal for use restriction, viewing of the processed data in the data viewer V (step S67).

Thus, the data trading system 1C of the fourth example embodiment restricts use of the processed data by the operator based on the use history of the processed data. Therefore, illicitly acquired processed data can be prevented from being leaked outside the relevant parties, which improves the security level of the system.

The determination result of the user evaluation unit 20 may be recorded in the apparatus or blockchain BC of the data trading system 1A. The information of the determination result recorded in this way can be utilized for other purposes, such as, as a basic material when receiving an audit.

The fourth example embodiment provides a similar effect to the third example embodiment.

Although the present disclosure has been described with reference to the example embodiments, the present disclosure is not limited by the above. The structure and details of the present disclosure can be made various changes that may be understood by those skilled in the art within the scope of the invention.

For example, in the above-described example embodiments, viewing of the processed data is performed on the data viewer V. However, in addition to this, a series of processing, such as processing process of the original data and protection process of the processed data, may be performed in the data viewer V. In this case, the data viewer V incorporates components such as the processing unit 12 and the protection unit 16.

In the above-described example embodiments, the storage unit (11a, 11b, 21, 41) is assumed to be included in the data trading apparatus (100a, 100b, 200, 300, 400). However, the storage unit may not be included in the data trading apparatus as long as the data trading apparatus is capable of accessing the storage unit. For example, the storage unit may be included in an external apparatus that is communicatively connected to the data trading apparatus.

Although the present disclosure has been described as a hardware configuration in the above example embodiments, the present disclosure is not limited thereto. The present disclosure can also be realized in various processes pertaining to a data trading method by causing a processor to execute a computer program.

In the examples described above, the program may be stored and supplied to a computer using any of various types of non-transitory computer-readable media. The non-transitory computer-readable media include various types of tangible storage media. Examples of the non-transitory computer-readable media include a magnetic recording medium (for example, a flexible disk, a magnetic tape, a hard disk drive), an optical magnetic recording medium (for example, an optical magnetic disk), a CD-ROM (read-only memory), a CD-R, a CD-R/W, a semiconductor memory (for example, a mask ROM, a PROM (programmable ROM), an EPROM (erasable ROM), a flash ROM, and a RAM (random access memory)). The program may also be supplied to a computer by any of various types of transitory computer-readable media. Examples of the transitory computer-readable media include electrical signals, optical signals, and electromagnetic waves. The transitory computer-readable medium can supply the program to a computer via a wired communication channel, such as an electrical wire and an optical fiber, or a wireless communication channel.

In the example embodiments described above, the computer consists of a computer system that includes a personal computer, a word processor, or the like. However, without limitation, the computer may consist of a local area network (LAN) server, a host for a computer (personal computer) communication, a computer system connected to the Internet, and/or the like. It is also possible to configure a computer throughout the network by distributing functions among various apparatuses on the network.

Some or all of the above example embodiments may also be described as the following supplementary notes, but are not limited to:

(Supplementary Note 1)

A data trading apparatus capable of accessing a blockchain, the data trading apparatus comprising:
 processing means for executing predetermined processing on original data and generating processed data as a result of the processing;
 processing information generation means for generating, in response to generation of the processed data, a first transaction including processing information indicating that the original data have been processed;
 history recording means for recording the first transaction in the blockchain;
 issuance means for issuing a processing certificate including the processing information;
 protection means for applying protection to the processed data; and
 trading means for trading with a secondary-side data trading apparatus and providing the protected processed data and the processing certificate to the secondary-side data trading apparatus,
 wherein, in response to an unsealing operation, the protected processed data are configured to require an operator to perform collation processing between processing information included in the processing certificate and processing information recorded in the blockchain.

(Supplementary Note 2)

The data trading apparatus according to Supplementary Note 1, wherein, when processing information included in the processing certificate does not correspond to processing information recorded in the blockchain, the protected processed data are configured to require the operator to send a collation result to the data trading apparatus or another apparatus capable of accessing the blockchain.

(Supplementary Note 3)

The data trading apparatus according to Supplementary Note 1 or 2, wherein the protection means applies protection to the processed data in such a way that use of the processed data by the operator is restricted when processing information included in the processing certificate does not correspond to processing information recorded in the blockchain.

(Supplementary Note 4)

The data trading apparatus according to any one of Supplementary Notes 1 to 3, wherein the trading means provides the secondary-side data trading apparatus with information necessary to access the first transaction recorded in the blockchain.

(Supplementary Note 5)

The data trading apparatus according to any one of Supplementary Notes 1 to 4, further comprising:
 a permitted party list configured to store identification information of an apparatus that can use the processed data; and
 user evaluation means for acquiring user identification information being identification information of an apparatus that uses the processed data from a second transaction recorded in the blockchain in association with the first transaction and determining whether the user identification information is included in the permitted party list.

(Supplementary Note 6)

The data trading apparatus according to Supplementary Note 5, wherein
 the second transaction has use information indicating a use history of the processed data; and
 the use information includes at least one of collation information indicating that collation processing of the processing information has been carried out with regard to the processed data, viewing information indicating that the processed data have been viewed, and trading information indicating that the processed data have been traded.

(Supplementary Note 7)

The data trading apparatus according to any one of Supplementary Notes 1 to 6, further comprising a processing means database configured to be shared with the secondary-side data trading apparatus, wherein the processing means executes predetermined processing on the original data by using processing means stored in the processing means database.

(Supplementary Note 8)

A data trading apparatus capable of accessing a blockchain, the data trading apparatus comprising:
trading means for trading with a primary-side data trading apparatus, and for receiving, from the primary-side data trading apparatus, processed data generated as a result of predetermined processing and protected, and a processing certificate including processing information indicating that the original data have been processed; and
collation processing means for collating, when unsealing the protected processed data, processing information included in the processing certificate with processing information included in a first transaction recorded in the blockchain.

(Supplementary Note 9)

The data trading apparatus according to Supplementary Note 8, wherein, when processing information included in the processing certificate does not correspond to processing information recorded in the blockchain, the collation processing means sends a collation result to the primary-side data trading apparatus or another apparatus capable of accessing the blockchain.

(Supplementary Note 10)

The data trading apparatus according to Supplementary Note 8 or 9, wherein, when processing information included in the processing certificate does not correspond to processing information recorded in the blockchain, the collation processing means restricts use of the processed data.

(Supplementary Note 11)

The data trading apparatus according to any one of Supplementary Notes 8 to 10, further comprising:
use information generation means for generating a second transaction that includes use information indicating a use history of the processed data; and
history recording means for recording the second transaction in the blockchain in association with the first transaction,
wherein the use information includes at least one of collation information indicating that collation processing of the processing information has been carried out with regard to the processed data, viewing information indicating that the processed data have been viewed, and trading information indicating that the processed data have been traded.

(Supplementary Note 12)

A data trading system comprising:
a primary-side data trading apparatus configured to be able to access a blockchain; and
a secondary-side data trading apparatus configured to be able to access the blockchain, wherein
the primary-side data trading apparatus includes:
processing means for executing predetermined processing on original data and generating processed data as a result of the processing;
processing information generation means for generating, in response to generation of the processed data, a first transaction that includes processing information indicating that the original data have been processed;
history recording means for recording the first transaction in the blockchain;
issuance means for issuing a processing certificate that includes the processing information;
protection means for applying protection to the processed data; and
primary-side trading means for trading with the secondary-side data trading apparatus and providing the protected processed data and the processing certificate to the secondary-side data trading apparatus,
the protected processed data are configured to require, in response to an unsealing operation, an operator to perform collation processing between processing information included in the processing certificate and processing information recorded in the blockchain, and
the secondary-side data trading apparatus includes:
secondary-side trading means for trading with the primary-side data trading apparatus, and for receiving the protected processed data and the processing certificate from the primary-side data trading apparatus; and
collation processing means for collating, when unsealing the protected processed data, processing information included in the processing certificate with processing information included in the first transaction recorded in the blockchain.

(Supplementary Note 13)

A data trading method comprising:
a processing step of executing predetermined processing on original data and generating processed data as a result of the processing;
a processing information generation step of generating, in response to generation of the processed data, a first transaction that includes processing information indicating that the original data have been processed;
a history recording step of recording the first transaction in a blockchain;
an issuance step of issuing a processing certificate including the processing information;
a protection step of applying protection to the processed data; and
a trading step of trading with a secondary-side data trading apparatus and providing the protected processed data and the processing certificate to the secondary-side data trading apparatus,
wherein, in response to an unsealing operation, the protected processed data are configured to require an operator to perform collation processing between processing information included in the processing certificate and processing information recorded in the blockchain.

(Supplementary Note 14)

A data trading method comprising:
a trading step of trading with a primary-side data trading apparatus, and receiving, from the primary-side data trading apparatus, processed data generated as a result of predetermined processing and protected, and a processing certificate including processing information indicating that the original data have been processed; and
a collation step of collating, when unsealing the protected processed data, processing information included in the processing certificate with processing information included in a first transaction recorded in a blockchain.

(Supplementary Note 15)

A non-transitory computer-readable medium storing a program for causing a computer to execute:
a processing process of executing predetermined processing on original data and generating processed data as a result of the processing;

a processing information generation process of generating, in response to generation of the processed data, a first transaction that includes processing information indicating that the original data have been processed;
a history recording process of recording the first transaction in a blockchain;
an issuance process of issuing a processing certificate including the processing information;
a protection process of applying protection to the processed data; and
a trading process of trading with a secondary-side apparatus and providing the protected processed data and the processing certificate to the secondary-side apparatus, wherein, in response to an unsealing operation, the protected processed data are configured to require an operator to perform collation processing between processing information included in the processing certificate and processing information recorded in the blockchain.

(Supplementary Note 16)

A non-transitory computer-readable medium storing a program for causing a computer to execute:
a trading process of trading with a primary-side data trading apparatus, and receiving, from the primary-side data trading apparatus, processed data generated as a result of predetermined processing and protected, and a processing certificate including processing information indicating that the original data have been processed; and
a collation process of collating, when unsealing the protected processed data, processing information included in the processing certificate with processing information included in a first transaction recorded in a blockchain.

REFERENCE SIGNS LIST 1, 1A, 1B, 1C DATA TRADING SYSTEM
4 BLOCKCHAIN NETWORK (NW)
5 ORIGINAL DATA PROVISION APPARATUS
6 ADMINISTRATOR APPARATUS
11a PRIMARY-SIDE STORAGE UNIT
11b SECONDARY-SIDE STORAGE UNIT
12 PROCESSING UNIT
13 PROCESSING INFORMATION GENERATION UNIT
14, 34 HISTORY RECORDING UNIT
15 ISSUANCE UNIT
16 PROTECTION UNIT
17 TRADING UNIT
17a PRIMARY-SIDE TRADING UNIT
17b SECONDARY-SIDE TRADING UNIT
18, 28 COLLATION PROCESSING UNIT
19 USE INFORMATION GENERATION UNIT
20 USER EVALUATION UNIT
21, 41 STORAGE UNIT
100, 200, 300, 400 DATA TRADING APPARATUS
100a PRIMARY-SIDE DATA TRADING APPARATUS
100b SECONDARY-SIDE DATA TRADING APPARATUS
200a, 300a, 400a PROCESSING PARTY APPARATUS
200b, 300b, 400b RECIPIENT APPARATUS
200c, 300c, 400c USER APPARATUS
1000 PROCESSOR
1010 ROM
1020 RAM
1030 INTERFACE UNIT (IF)
BC BLOCKCHAIN
V DATA VIEWER
TX TRANSACTION

What is claimed is:

1. A data trading apparatus capable of accessing a blockchain, the data trading apparatus comprising:
at least one memory storing instructions; and
at least one processor configured to execute the instructions to:
execute predetermined processing on original data using processing means information stored in a procesing means database that is shared with other data trading apparatuses, and generate processed data as a result of the processing;
determine whether the data trading apparatus is identified in a list of permitted devices associated with the processing means stored in the processing means database, and allow execution of the predetermined processing only when the data trading apparatus is included in the permitted device list,
generate, in response to generation of the processed data, a first transaction including processing information indicating that the original data have been processed;
record the first transaction in the blockchain;
issue a processing certificate including the processing information;
apply protection to the processed data; and
trade with a secondary-side data trading apparatus and provide the protected processed data and the processing certificate to the secondary-side data trading apparatus,
wherein, in response to an unsealing operation, the processing information included in the processing certificate and the processing information recorded in the blockchain are used to prove that the processed data have not been tampered with by performing collation between them.

2. The data trading apparatus according to claim 1, wherein, when processing information included in the processing certificate does not correspond to processing information recorded in the blockchain, the protected processed data are configured to require the operator to send a collation result to the data trading apparatus or another apparatus capable of accessing the blockchain.

3. The data trading apparatus according to claim 1, wherein the at least one processor is further configured to execute the instructions to apply protection to the processed data in such a way that use of the processed data by the operator is restricted when processing information included in the processing certificate does not correspond to processing information recorded in the blockchain.

4. The data trading apparatus according to claim 1, wherein the at least one processor is further configured to execute the instructions to provide the secondary-side data trading apparatus with information necessary to access the first transaction recorded in the blockchain.

5. The data trading apparatus according to claim 1, further comprising:
a permitted party list configured to store identification information of an apparatus that is allowed to use the processed data, wherein
the at least one processor is further configured to execute the instructions to:
acquire user identification information being identification information of an apparatus that attempts to use the processed data from a second transaction recorded in the blockchain in association with the first transaction, determine whether the user identification information is included in the permitted party list, and when the user identification information is not included in the permitted party list, deny or restrict use of the processed data by the apparatus.

6. The data trading apparatus according to claim 5, wherein the second transaction includes use information indicating a use history of the processed data; and the use information includes at least one of collation information indicating that collation processing of the processing information has been carried out with regard to the processed data, viewing information indicating that the processed data have been viewed, and trading information indicating that the processed data have been traded.

7. The data trading apparatus according to claim 1, wherein the processing means database stores a list of permitted devices for each processing means, and the at least one processor is configured to execute the instructions to determine whether the data trading apparatus is included in the list of permitted devices for the selected processing means before executing the processing.

8. A computer-implemented data trading method comprising:

executing predetermined processing on original data using processing means information stored in a processing means database that is shared with other data trading apparatuses, and generating processed data as a result of the processing;

determining whether a data trading apparatus is identified in a list of permitted devices associated with the processing means stored in the processing means database, and allowing execution of the predetermined processing only when the data trading apparatus is included in the permitted device list;

generating, in response to the generation of the processed data, a first transaction including processing information indicating that the original data have been processed;

recording the first transaction in a blockchain;

issuing a processing certificate including the processing information;

applying protection to the processed data;

trading with a secondary-side data trading apparatus and providing the protected processed data and the processing certificate to the secondary-side data trading apparatus; and in response to an unsealing operation, performing collation between the processing information included in the processing certificate and the processing information recorded in the blockchain to prove that the processed data have not been tampered with.

* * * * *